(12) United States Patent
Shinoda et al.

(10) Patent No.: US 6,190,620 B1
(45) Date of Patent: *Feb. 20, 2001

(54) WET FLUE GAS DESULFURIZER

(75) Inventors: Takeo Shinoda, Tokyo; Toru Takashina; Masakazu Onizuka, both of Hiroshima, all of (JP)

(73) Assignee: Mitsubishi Heavy Industries, Ltd., Tokyo (JP)

(*) Notice: Under 35 U.S.C. 154(b), the term of this patent shall be extended for 0 days.

This patent is subject to a terminal disclaimer.

(21) Appl. No.: 09/185,803

(22) Filed: Nov. 4, 1998

(30) Foreign Application Priority Data

Nov. 5, 1997 (JP) .................................. 9-302654
Jan. 27, 1998 (JP) ................................ 10-029170

(51) Int. Cl.⁷ .................................................. B01D 53/34
(52) U.S. Cl. ................... 422/171; 422/169; 422/170; 422/224; 422/225; 422/231; 422/234
(58) Field of Search .......................... 422/171–172, 422/224–225, 231, 168–170, 234; 423/555

(56) References Cited

U.S. PATENT DOCUMENTS 4,229,417 * 10/1980 Kanai et al. .................... 422/231
5,132,027 * 7/1992 Ukawa et al. ................... 423/555
5,840,263 * 11/1998 Shinoda et al. .................. 422/169
6,001,321 * 12/1999 Okazoe et al. .................... 422/171

FOREIGN PATENT DOCUMENTS

| 2 164 576A | 3/1986 | (GB) . |
| 62-193630 | 8/1987 | (JP) . |
| 4-137731 | 12/1992 | (JP) . |
| 09010546 | 1/1997 | (JP) . |

\* cited by examiner

*Primary Examiner*—Hien Tran
(74) *Attorney, Agent, or Firm*—Myers Bigel Sibley & Sajovec

(57) ABSTRACT

A wet flue gas desulfurizer wherein sulfur dioxide is absorbed into a slurry and an oxygen-containing gas is blown into the slurry to oxidize sulfites present in the slurry is characterized in that a slurry oxidation tank is equipped with a return pipeline for returning a portion of the slurry to a position at or near the bottom of the slurry oxidation tank, and the oxygen-containing gas is blown in at the discharge end of the return pipeline so as to divide the oxygen-containing gas finely by the action of the slurry returned through the return pipeline.

4 Claims, 10 Drawing Sheets

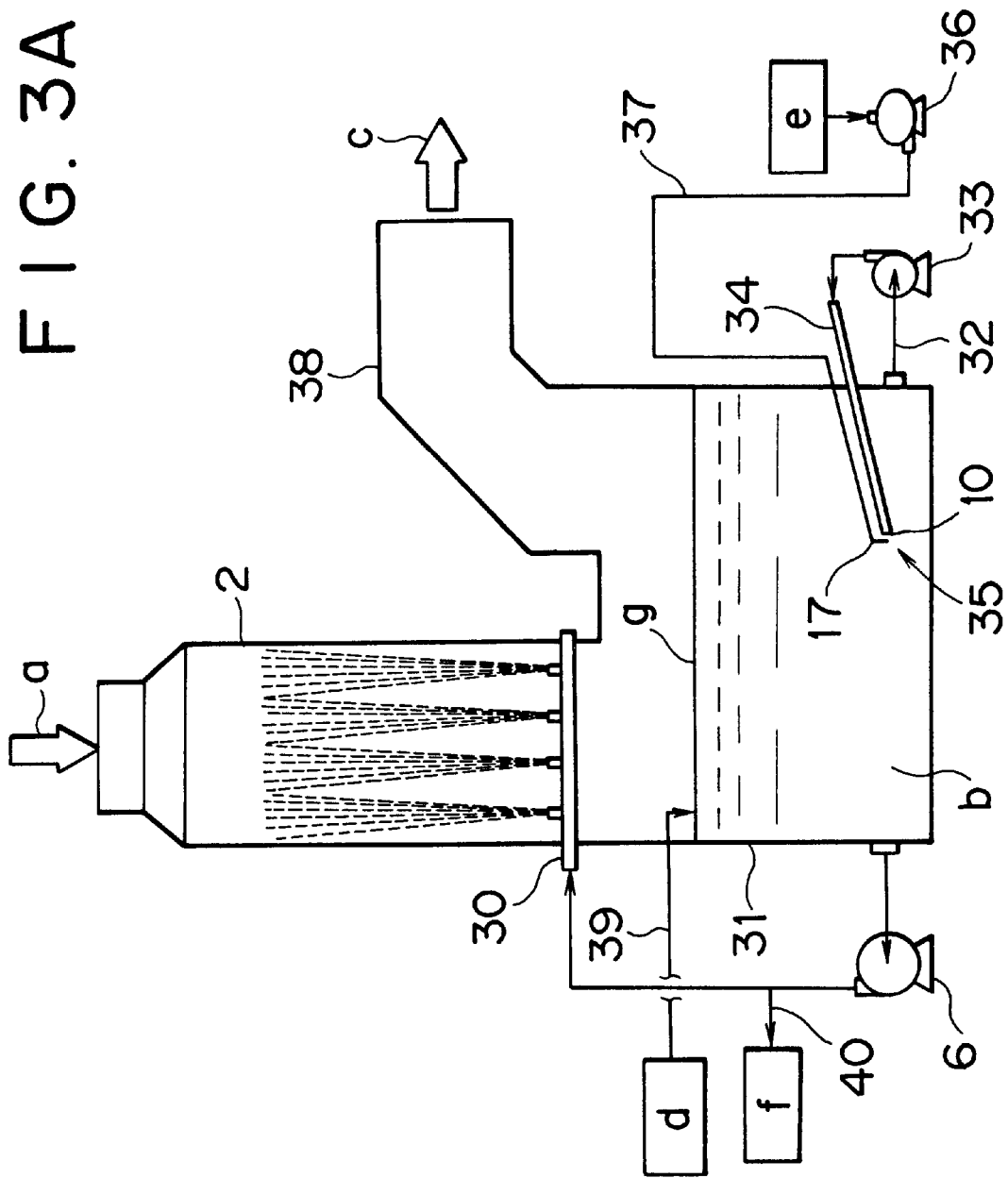

VIEW IN THE DIRECTION OF ARROW B

VIEW IN THE DIRECTION OF ARROW C

US 6,190,620 B1

WET FLUE GAS DESULFURIZER

FIELD OF THE INVENTION AND RELATED ART STATEMENT

This invention relates to wet flue gas desulfurizers. More particularly, it relates to a wet flue gas desulfurizer for removing $SO_2$ from the exhaust gas of a boiler or the like by wet desulfurization, and an oxygen-containing gas blowing device for use therein.

When a sulfur-containing fuel is burned, the sulfur is discharged into the atmosphere in the form of sulfur dioxide ($SO_2$), except for that fixed in ash. This sulfur dioxide exerts a significant harmful influence not only on human beings and animals, but also on the environment by causing acid rain to fall on the earth.

For this reason, large-scale combustion facilities and plants have conventionally been equipped with flue gas desulfurizers, most of which are wet flue gas desulfurizers.

In such a wet desulfurization process, exhaust gas is brought into gas-liquid contact with an absorbing fluid containing an alkali such as lime, so that $SO_2$ is absorbed and removed from the exhaust gas. As a result, the $SO_2$ absorbed from the exhaust gas forms sulfites in the absorbing fluid. In order to oxidize these sulfites and thereby form stable sulfates, it has been common practice to oxidize them by blowing air into the absorbing fluid.

Commonly employed wet flue gas desulfurizers are of the so-called tank oxidation type. In this type of wet flue gas desulfurizer, an oxygen-containing gas (typically air) is blown into an tank of an absorption tower, where it is brought into contact with a slurry (containing a calcium compound such as limestone) having sulfur dioxide absorbed therein so as to oxidize the sulfur dioxide. Thus, the necessity of an oxidation tower is eliminated.

In this case, it is necessary to bring air into efficient contact with the slurry in the aforesaid tank. For this purpose, various methods and devices have been known in the prior art.

FIG. 7 illustrates an oxygen feeding device described in Japanese Patent Provisional Publication No. 61-74630. In this device, air is blown into a slurry oxidation tank 201 by means of an oxygen feeding means 202. The blown-in air is dispersed with an agitator 203 to improve the efficiency of air utilization.

However, the conventional device of FIG. 7 has difficulties in that unduly great power is required to agitate the slurry within oxidation tank 201, and the efficiency of utilization of the injected oxygen is low.

Moreover, FIG. 8 illustrates a device constructed according to Japanese Patent Publication No. 6-91939. Also in this device, air is blown into a region in the vicinity of an agitator 302 by means of an oxygen feeding means 303. However, the device of FIG. 8 also has difficulties in that unduly great power is required to agitate the slurry within oxidation tank 301, and the efficiency of utilization of the injected oxygen is low.

The present inventor has also employed a stationary oxidation device in prior art oxidation equipment (Japanese Patent Provisional Publication No. 9-10546). However, owing to its low efficiency of oxygen utilization (usually about 20%), the flow rate of oxidizing air or the number of sparger nozzles must be increased to cause problems from the viewpoint of equipment cost and maintainability.

Moreover, in the device which has conventionally been employed by the present inventor as described in Japanese Patent Provisional Publication No. 9-10546 or the like, the sparger itself is rotated to produce finely divided air bubbles and agitate the liquid at the same time. However, since this device masticates air, a loss in agitation capability is caused and unduly great power is required.

On the other hand, FIG. 9 illustrates a wet flue gas desulfurizer having such an oxygen-containing gas blowing means (hereinafter referred to as a first example of the prior art). As shown in FIG. 9, this wet flue gas desulfurizer is constructed so that it has an absorption tower 2 for effecting wet desulfurization, a fluid reservoir 31 for storing an absorbing fluid b containing an alkaline absorbent d (e.g., lime) is disposed below absorption tower 2, and the absorbing fluid b within fluid reservoir 31 is raised by means of a circulating pump 6 and sprayed through spray pipes 30 disposed in the lower part of absorption tower 2.

In the above-described equipment construction, combustion exhaust gas a is introduced into absorption tower 2 at the top thereof, and brought into gas-liquid contact with the alkali-containing absorbing fluid sprayed through spray pipes 30 so as to absorb and remove $SO_2$ from the exhaust gas. Thereafter, the cleaned exhaust gas c is discharged to the outside through an exhaust duct 38. The absorbing fluid in which sulfites have been formed from $SO_2$ absorbed from the exhaust gas is returned to fluid reservoir 31, where the aforesaid sulfites are oxidized to sulfates with the aid of an oxygen-containing gas e fed by an oxygen-containing gas blowing means. Thereafter, an amount of the sulfates which is stoichiometrically equivalent to that of $SO_2$ absorbed are discharged as waste fluid f by way of circulating pump 6 and a pipeline 40. On the other hand, the alkaline absorbent d (e.g., lime) is supplied to the aforesaid fluid reservoir 31 by way of a pipeline 39.

The aforesaid oxygen-containing gas blowing means comprises a plurality of nozzle headers 102 which extend from the sidewall of fluid reservoir 31 in a downwardly inclined direction and are each equipped with a plurality of feed nozzles 101. These nozzle headers 102 are disposed so as to cover substantially the entire bottom surface of fluid reservoir 31. Thus, using a blower 36, oxygen-containing gas e is fed through a pipeline 37 and nozzle headers 102, and injected from the injection orifices 35 of feed nozzles 101 into the absorbing fluid b for the purpose of oxidizing the sulfites.

FIG. 10 illustrates the construction of a wet flue gas desulfurizer having another oxygen-containing gas blowing means. This represents a practically employed oxidation method in which an injection orifice 35 at the tip of a pipeline 37 is disposed in front of an agitator 203 attached to the sidewall of fluid reservoir 31, and an oxygen-containing gas e fed through pipeline 37 by means of a blower 36 is injected from injection orifice 35 into the absorbing fluid b so as to promote the dispersion of oxygen-containing gas e by the jet of the absorbing fluid b that is driven by the aforesaid agitator 203. (This oxygen-containing gas blowing means will hereinafter be referred to as a second example of the prior art.)

Moreover, as illustrated in FIG. 11, Japanese Utility Model Provisional Publication No. 4-137731 discloses an oxygen-containing gas blowing means comprising a plurality of jet nozzles 151 for injecting a jet of an absorbing fluid in a direction forming a predetermined angle with the corresponding diameter of a fluid reservoir 150. These jet nozzles 151 are attached to the sidewall of fluid reservoir 150 at a predetermined vertical position so as to inject the absorbing fluid in the circumferential direction of the sidewall. The basal end of each jet nozzle 151 is provided with an absorbing fluid pipeline 153 communicating with fluid reservoir 150 and having a jet pump 152 installed in an intermediate part thereof, and a gas pipe 154 is connected to absorbing fluid pipeline 153 between jet pump 152 and jet nozzle 151. (This oxygen-containing gas blowing means will hereinafter be referred to as a third example of the prior art.)

Furthermore, a further oxygen-containing gas blowing means has been known. Specifically, as illustrated in FIG. 12, a delivery pipe 161 is attached so as to penetrate into a fluid reservoir 160 through the sidewall thereof, and connected with a circulating fluid pipe 163 for sucking out an absorbing fluid from fluid reservoir 160 and circulating it by means of a fluid pump 162. Moreover, a gas blowing pipe 164 is attached so as to penetrate into an intermediate part of the aforesaid circulating fluid pipe 163, and its outlet part 164a is bent at the center of circulating fluid pipe 163 so as to be open in the direction of fluid flow. Thus, an oxygen-containing gas is fed through gas blowing pipe 164 under pressure by means of a blower 165, blown into circulating fluid pipe 163, and discharged from delivery pipe 161 together with the absorbing fluid. (This oxygen-containing gas blowing means will hereinafter be referred to as a fourth example of the prior art.)

Although all of the above-described oxygen-containing gas blowing means in accordance with the first to fourth examples of the prior art provide excellent oxidation methods, they involve the following problems.

For example, the first example of the prior art illustrated in FIG. 9 has the disadvantage that, since a large number of feed nozzles 101 are disposed so as to cover substantially the whole bottom surface of fluid reservoir 31, this may hinder inspection and other operations in fluid reservoir 31.

In the second example of the prior art illustrated in FIG. 10, as a result of an upward flow induced by the air-lifting action of oxygen-containing gas e injected from injection orifice 35, agitating blades 204 tend to cause a local circulation in which a portion of the fluid just delivered is sucked in again, resulting in reduced agitation efficiency. Moreover, this also decreases the throw of the discharged fluid, resulting in reduced agitation capability. Accordingly, it is necessary to maintain the agitation capability by strengthening the agitation power.

In the third and fourth examples of the prior art illustrated in FIGS. 11 and 12, a gas is fed to an intermediate part of absorbing fluid pipeline 153 or 163 connected to jet nozzle 151 or delivery pipe 161. Consequently, while gas bubbles flow through the absorbing fluid pipeline together with the absorbing fluid, some of them may combine together to form coarse bubbles, or the gas and the absorbing fluid may separate into discrete phases. When the gas is discharged from jet nozzle 151 or delivery pipe 161 in such a state, it cannot be uniformly dispersed and fails to achieve smooth oxidation. Moreover, the gas tends to cause the problem of erosion of the internal surface of the absorbing fluid pipe due to cavitation.

OBJECTS AND SUMMARY OF THE INVENTION

In view of this existing state of the art, an object of the present invention is to provide a wet flue gas desulfurizer which does not require unduly great power in order to agitate the slurry within the slurry oxidation tank, and can enhance the efficiency of utilization of the injected oxygen.

Moreover, the present invention has been made with a view to overcoming the above-described disadvantages. Accordingly, another object of the present invention is to provide an oxygen-containing gas blowing means for use in a wet flue gas desulfurizer which can achieve a marked reduction in the number of feed nozzles, a reduction in power, and a marked improvement in the capacity for agitating and dispersing the absorbing fluid.

In order to accomplish the above objects, the present invention provides a wet flue gas desulfurizer wherein sulfur dioxide is absorbed into a slurry and an oxygen-containing gas is blown into the slurry within a slurry oxidation tank to oxidize sulfites present in the slurry, characterized in that the slurry oxidation tank is equipped with a return pipeline for returning a portion of the slurry to a position at or near the bottom of the slurry oxidation tank, and the oxygen-containing gas is blown in at the discharge end of the return pipeline so as to divide the oxygen-containing gas finely by the action of the slurry returned through the return pipeline.

It is a preferred embodiment that, in the above-described wet flue gas desulfurizer, a portion of the slurry stored in the slurry oxidation tank is withdrawn and returned through the return pipeline.

It is another preferred embodiment that, in the above-described wet flue gas desulfurizer, the slurry injected from header pipes is returned through the return pipeline.

It is still another preferred embodiment that, in the above-described wet flue gas desulfurizer, the slurry collected by a mist eliminator is returned through the return pipeline.

It is a further preferred embodiment that, in the above-described wet flue gas desulfurizer, when a portion of the slurry is withdrawn at a position near the bottom of the slurry oxidation tank and sent to header pipes under pressure by means of a pressure pump, a slurry delivery pipe is branched from the pipeline for sending the slurry to the header pipes, and the oxygen-containing gas is blown in at the discharge end of the delivery pipe so as to divide the oxygen-containing gas finely by the action of the slurry discharged from the delivery pipe.

The present invention also provides an oxygen-containing gas blowing device for use in a wet flue gas desulfurizer for removing $SO_2$ from combustion exhaust gas by wet desulfurization, wherein a fluid reservoir for an absorbing fluid is equipped with a delivery pipe for discharging the absorbing fluid so that its discharge end is open in the fluid reservoir, and an oxygen feed nozzle for injecting an oxygen-containing gas is disposed in the area of the discharged stream in the neighborhood of the discharge end of the delivery pipe (i.e., just behind or before the discharge end).

According to the present invention, the jet of the absorbing fluid discharged from the discharge end at the tip of the absorbing fluid delivery pipe is accompanied by a wake and hence moves in the direction of discharge at an increased flow rate. Thus, the oxygen-containing gas injected from the oxygen feed nozzle can be widely dispersed in the form of gas bubbles while overcoming an upward flow induced by its air-lifting action.

Consequently, the number of oxygen feed nozzles can be markedly reduced. Moreover, since the delivery part may be disposed apart from the suction part for sucking in the absorbing fluid by means of a pump, no local circulation is caused. Furthermore, since the discharged jet of the absorbing fluid is accompanied by a wake and hence moves in the direction of discharge at an increased flow rate, high efficiency can be achieved in the dispersion of gas bubbles without requiring any extra power.

Moreover, according to the present invention, an oxygen-containing gas is injected into the area of the discharged stream in the neighborhood of the discharge end of the delivery pipe (i.e., just behind or before the discharge end), in contrast to the third and fourth examples of the prior art in which an oxygen-containing gas is fed to a fluid pipeline on the upstream side of a delivery pipe. Thus, only the absorbing fluid is supplied up to the discharge end, so that the above-described problems, such as the combination of gas bubbles in the fluid pipeline, the separation of the gas from the absorbing fluid, and the resulting poor dispersion of discharged gas bubbles and poor performance of the fluid pipeline, can be solved. Moreover, since the injected gas collides with the discharged stream at a position just behind or before the discharge end where the discharged stream has the highest flow velocity, the injected gas is finely divided and smoothly dispersed to achieve the smooth oxidation of sulfites over a wide area.

In the device of the present invention, an injection orifice at the tip of the oxygen feed nozzle may effectively be disposed in the area of the jet discharged from the aforesaid delivery pipe. Thus, the oxygen-containing gas injected from the oxygen feed nozzle can be dispersed in the form of fine gas bubbles.

Moreover, the device of the present invention may be constructed in such a way that the upper part of the tip of the delivery pipe is made longer so as to overhang the lower part thereof, and the oxygen feed nozzle is attached so as to extend through the overhanging part. Thus, the oxygen-containing gas injected from the oxygen feed nozzle can be prevented from blowing through.

Furthermore, the aforesaid delivery pipe may be inclined downward in the fluid reservoir. This makes it possible to prevent solid matter from depositing in the delivery tube or flowing back thereinto when the circulation of the absorbing fluid by means of a pump is stopped. In this case, the delivery pipe may be inclined until it stands upright.

Furthermore, the device of the present invention may be constructed in such a way that the aforesaid oxygen feed nozzle penetrates into the delivery pipe at a position before the discharge end of the delivery pipe. Thus, the oxygen-containing gas can be dispersed in the form of finer gas bubbles. Moreover, since the residence time of a gas-liquid mixed flow in the delivery pipe is minimized, it is possible to minimize the damage of the delivery pipe by a gas-liquid mixed flow while overcoming the disadvantages of the above-described third and fourth examples of the prior art.

Furthermore, the device of the present invention may be constructed in such a way that the aforesaid delivery pipe penetrates into the fluid reservoir through the sidewall thereof, and the delivery pipe is radially deflected toward a tangential direction so as to cause the stream discharged from the delivery pipe to flow along the sidewall of the fluid reservoir. Thus, a circular flow can be produced in the aforesaid fluid reservoir so as to further prolong the gas-liquid contact time between the oxygen-containing gas and the absorbing fluid.

BRIEF DESCRIPTION OF THE DRAWINGS

FIG. 3(A) is a schematic elevational view showing the overall construction of a wet flue gas desulfurizer (gas-liquid contact apparatus) in accordance with the present invention.

Figure 1:
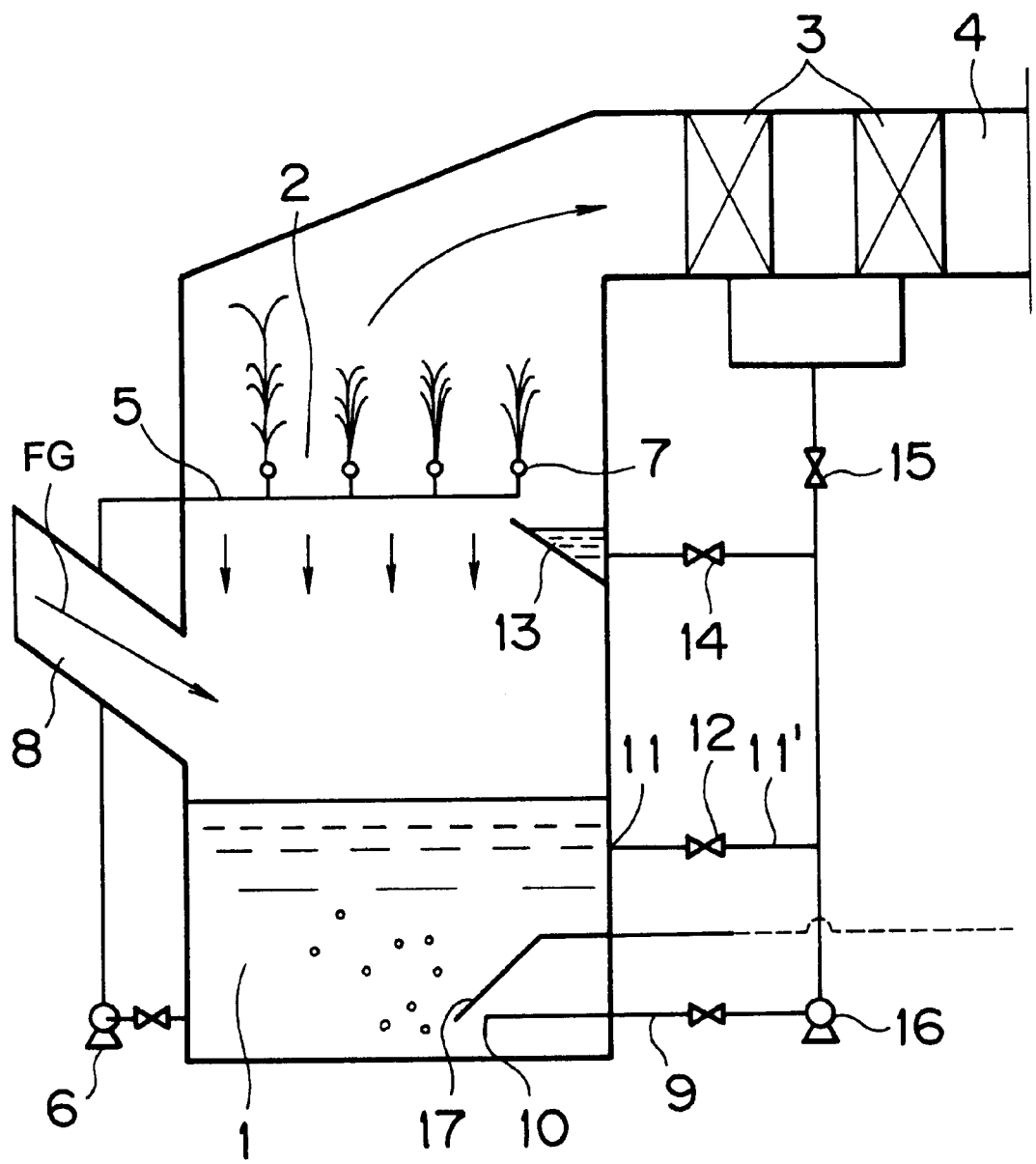
FIG. 1 is a schematic view for explaining a wet flue gas desulfurizer in accordance with one embodiment (Embodiment 1) of the present invention.

In the accompanying drawings, the reference characters are defined as follows: 1, 201 or 301, slurry oxidation tank; 2, absorption tower; 3, mist eliminator; 4, flue gas outlet section; 5, header pipe; 6, circulating pump; 7, nozzle; 8, flue gas inlet section; 9 and 20, return pipeline; 10 or 24, discharge end; 11, upper withdrawal opening; 12, 14, 15, 21, 22 and 23, valves; 13, fluid receiver; 16, return pump; 17 or 17', oxygen feed nozzle; 18 and 19, pipelines; 25, 202 or 303, oxygen feeding means; 203 or 302, agitator; 204, agitating blades; 30, spray pipe; 31, fluid reservoir; 32, pipeline; 33, pump; 34, delivery pipe; 35, injection orifice; 36, blower; 37, pipeline; 38, exhaust duct; 39 and 40, pipelines; 101, feed nozzle; 102, nozzle header; a, combustion exhaust gas; b, absorbing fluid; c, cleaned exhaust gas; d, absorbent; e, oxygen-containing gas; f, waste fluid; g, liquid surface; A, B, or C denote directions from which to view certain figures. e.g., A is referenced for FIG. 4, B is referenced for FIG. 5, and C is referenced for FIG. 6.

DETAILED DESCRIPTION OF PREFERRED EMBODIMENTS

For purposes of illustration, several preferred embodiments of the present invention are specifically described hereinbelow with reference to the accompanying drawings. It is to be understood that, in these embodiments, the dimensions, materials, shapes and relative arrangement of various components are given solely to illustrate the present invention and not to limit the scope thereof, unless otherwise specified.

Embodiment 1

A wet flue gas desulfurizer in accordance with one embodiment of the present invention is illustrated in FIG. 1.

This wet flue gas desulfurizer has a slurry oxidation tank 1 to which an absorbent slurry is fed, an absorption tower 2 extending upward above slurry oxidation tank 1, and a flue gas outlet section 4 equipped with a mist eliminator 3. Moreover, absorption tower 2 has header pipes 5, which are equipped with nozzles 7 for injecting the absorbent slurry sent by means of a circulating pump 6.

In this wet flue gas desulfurizer, flue gas FG introduced through a flue gas inlet section 8 is brought into gas-liquid contact with the absorbent slurry injected from nozzles 7 and flowing downward, so that the absorbent slurry absorbs sulfur dioxide present in the flue gas and then falls into slurry oxidation tank 1. In the absorbent slurry within slurry oxidation tank 1, a small amount of limestone used as the absorbent and gypsum so formed are suspended or dissolved. The absorbent slurry containing gypsum is withdrawn by means of a withdrawal pump (not shown) and introduced into a solid-liquid separator (also not shown), where it is separated into solid matter (i.e., gypsum) and filtrate. Thus, the absorbed sulfur dioxide is completely oxidized to yield gypsum as a by-product. The filtrate is transferred to a filtrate tank (not shown) and mixed with limestone, and the resulting absorbent slurry is returned back to slurry oxidation tank 1.

The reactions taking place in absorption tower 2 and slurry oxidation tank 1 are as follows:

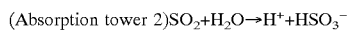

(Absorption tower 2) $SO_2 + H_2O \rightarrow H^+ + HSO_3^-$

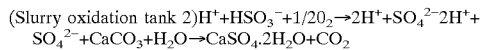

(Slurry oxidation tank 2) $H^+ + HSO_3^- + 1/2O_2 \rightarrow 2H^+ + SO_4^{2-} 2H^+ + SO_4^{2-} + CaCO_3 + H_2O \rightarrow CaSO_4 \cdot 2H_2O + CO_2$ According to the present invention, an epoch-making improvement has been made on the oxygen feeding means employed for the oxidation of sulfur dioxide. Specifically, slurry oxidation tank 1 is equipped with a return pipeline 9 for returning a portion of the absorbent slurry to a position at or near the bottom of slurry oxidation tank 1, and an oxygen-containing gas is blown in at the discharge end 10 of return pipeline 9. Typically, air is used as the oxygen-containing gas.

In this embodiment, a portion of the absorbent slurry stored in slurry oxidation tank 1 may be withdrawn from an upper withdrawal opening 11 of slurry oxidation tank 1 by way of a valve 12, and returned to slurry oxidation tank 1 through the aforesaid return pipeline 9.

Alternatively, the absorbent slurry injected from header pipes 5 may be collected by a fluid receiver 13 and returned to slurry oxidation tank 1 through the aforesaid return pipeline 9 by way of a valve 14.

Alternatively, the absorbent slurry collected by mist eliminator 3 may be returned to slurry oxidation tank 1 through the aforesaid return pipeline 9 by way of a valve 15. It is a recent trend to treat exhaust gas by feeding it at a high flow rate, and the present invention permits the effective utilization of the absorbent slurry scattered off and collected by mist eliminator 3.

The opening or closing of valves 12, 14 and 15 is controlled according to the operating state of the equipment. Since the absorbent slurry is returned in the above-described manner, a sufficient static head can be obtained and, therefore, the head of the pump itself can be reduced, resulting in a marked reduction in the load of return pump 16. Especially, when valve 12 is closed and only valves 14 and 15 are opened, the absorbent slurry can be returned without substantially operating return pump 16.

When the absorbent slurry is returned in the above-described manner, air blown in from the oxygen feed nozzle 17 of the oxygen feeding means is finely divided by the flow of the absorbent slurry itself. Thus, air bubbles are efficiently dispersed and mixed, so that the efficiency of utilization of oxygen in the oxidation of sulfur dioxide is markedly enhanced as compared with the conventional level of about 20%.

Embodiment 2

Figure 2:
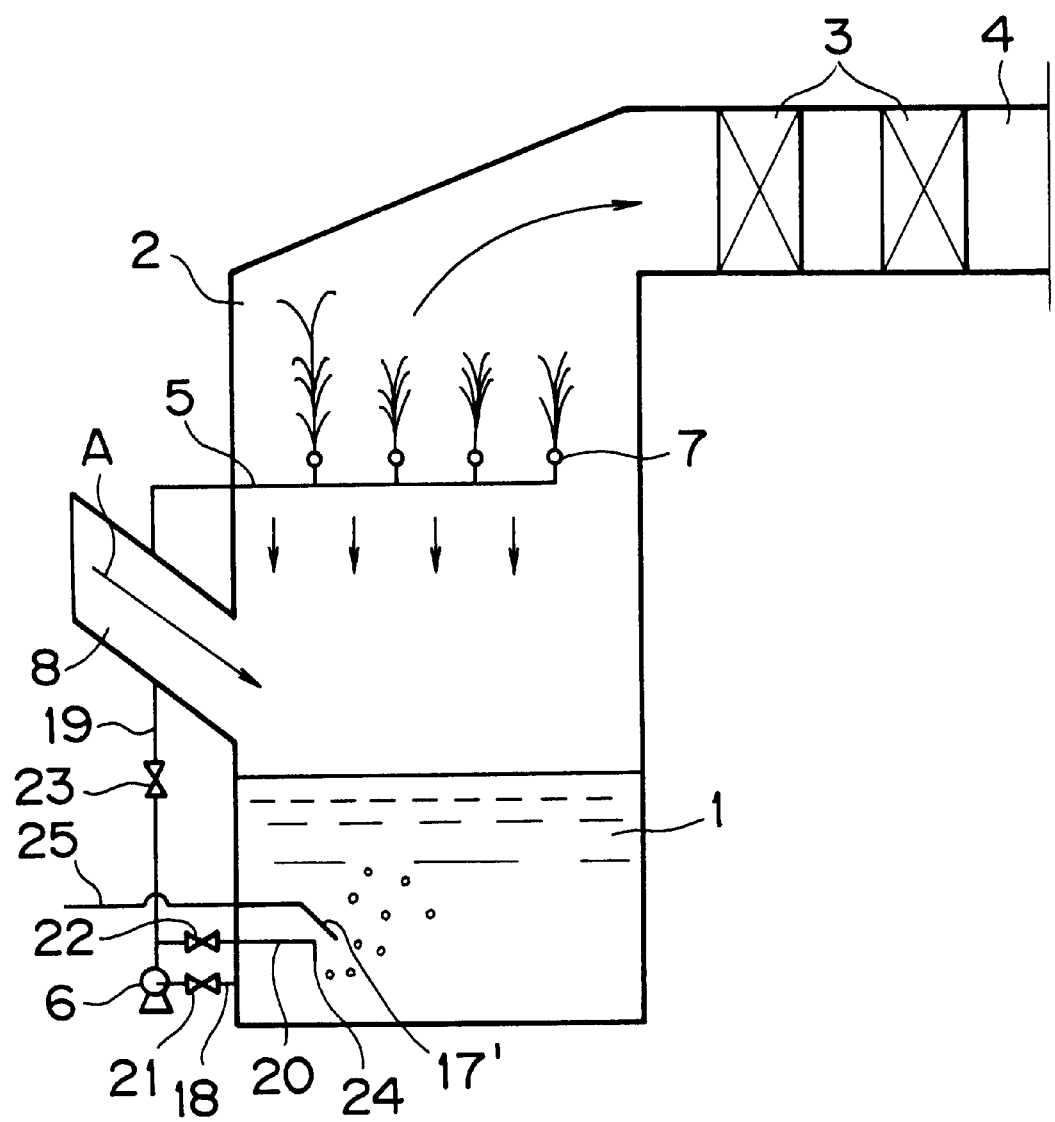
FIG. 2 is a schematic view for explaining a wet flue gas desulfurizer in accordance with another embodiment (Embodiment 2) of the present invention.

A wet flue gas desulfurizer in accordance with another embodiment of the present invention is illustrated in FIG. 2.

In FIG. 2, components similar to those shown in FIG. 1 are designated by the same reference characters as given in FIG. 1. The components designated by the same reference characters act and function in the same manner as those shown in FIG. 1.

In this embodiment, the absorbent slurry is withdrawn through a slurry withdrawal pipe 18 by way of a valve 21 and a circulating pump 6, sent under pressure through an intermediate pipeline 19 having a valve 23, and injected into exhaust gas A from nozzles 7 formed in header pipes 5. Moreover, a return pipe 20 is branched from intermediate pipeline 19 through the medium of a valve 22. Thus, the function of pipes 18 and 20 corresponds to that of pipelines 11' and 9 in the embodiment of FIG. 1. That is, after the absorbent slurry is withdrawn through pipe 18, part or all of the absorbent slurry sent to header pipes 5 by way of circulating pump 6 is returned through return pipe 20 to slurry oxidation tank 1 by operating valves 22 and 23. An oxygen feed nozzle 17' of an oxygen feeding means 25 is disposed in the neighborhood of the discharge end 24 of return pipe 20, so that the air injected therefrom is finely divided by the flow of the absorbent slurry itself. Their functions are similar to those of the aforesaid oxygen feed nozzle 17 and discharge end 10.

Embodiment 3

Although a gas-liquid contact apparatus of the so-called liquid column type is employed in the embodiment described above with reference to FIG. 1, the present invention is not limited thereto, but may also be applied to a gas-liquid contact apparatus having a packed section which is filled with a packing material to hold the falling absorbent slurry and thereby increase the gas-liquid contact area.

Moreover, the desulfurizer may be of the type in which the gas-liquid contact apparatus consists of a parallel-flow absorption tower and a counterflow absorption tower that are installed on the flue gas inlet side and flue gas outlet side of a single slurry oxidation tank, respectively.

Furthermore, the present invention may also be applied to various other types of wet flue gas desulfurizers, and is not limited to the type of FIG. 1.

In the embodiment described above with reference to FIG. 1, a portion of the absorbent slurry stored in slurry oxidation tank 1, the absorbent slurry injected from header pipes 5, and the absorbent slurry collected by mist eliminator 3 are utilized. However, the absorbent slurry may also be returned from any other part of the equipment, provided that the absorbent slurry so used suits the purpose of the present invention.

In the above-described embodiment, the aforesaid three types of absorbent slurry may be utilized. The purpose of this construction is to offer a wide choice in the type of the slurry being returned and thereby allow the apparatus to function effectively according to its operating state. However, depending on the operating conditions, only one of the three types of absorbent slurry may be returned. If only the absorbent slurry injected from header pipes 5 and the absorbent slurry collected by mist eliminator 3 is used, return pump 16 may be omitted.

Furthermore, the device of Embodiment 2 described above with reference to FIG. 1 may be employed in combination with the device of Embodiment 1 described above with reference to FIG. 1.

Embodiment 4

Figure 9:
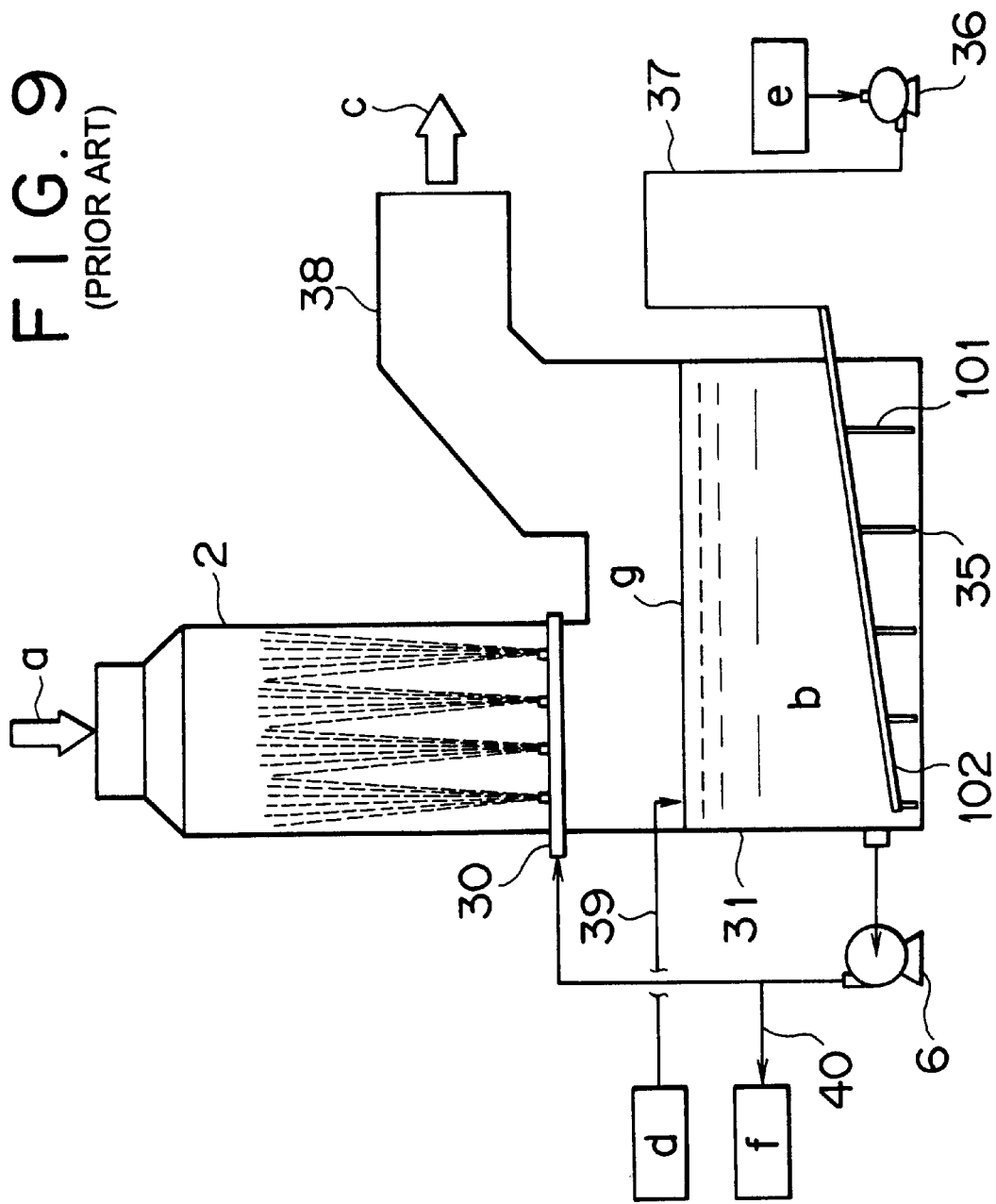
FIG. 9 is a schematic elevational view showing the overall construction of a gas-liquid contact apparatus in accordance with a first example of the prior art.
Figure 10:
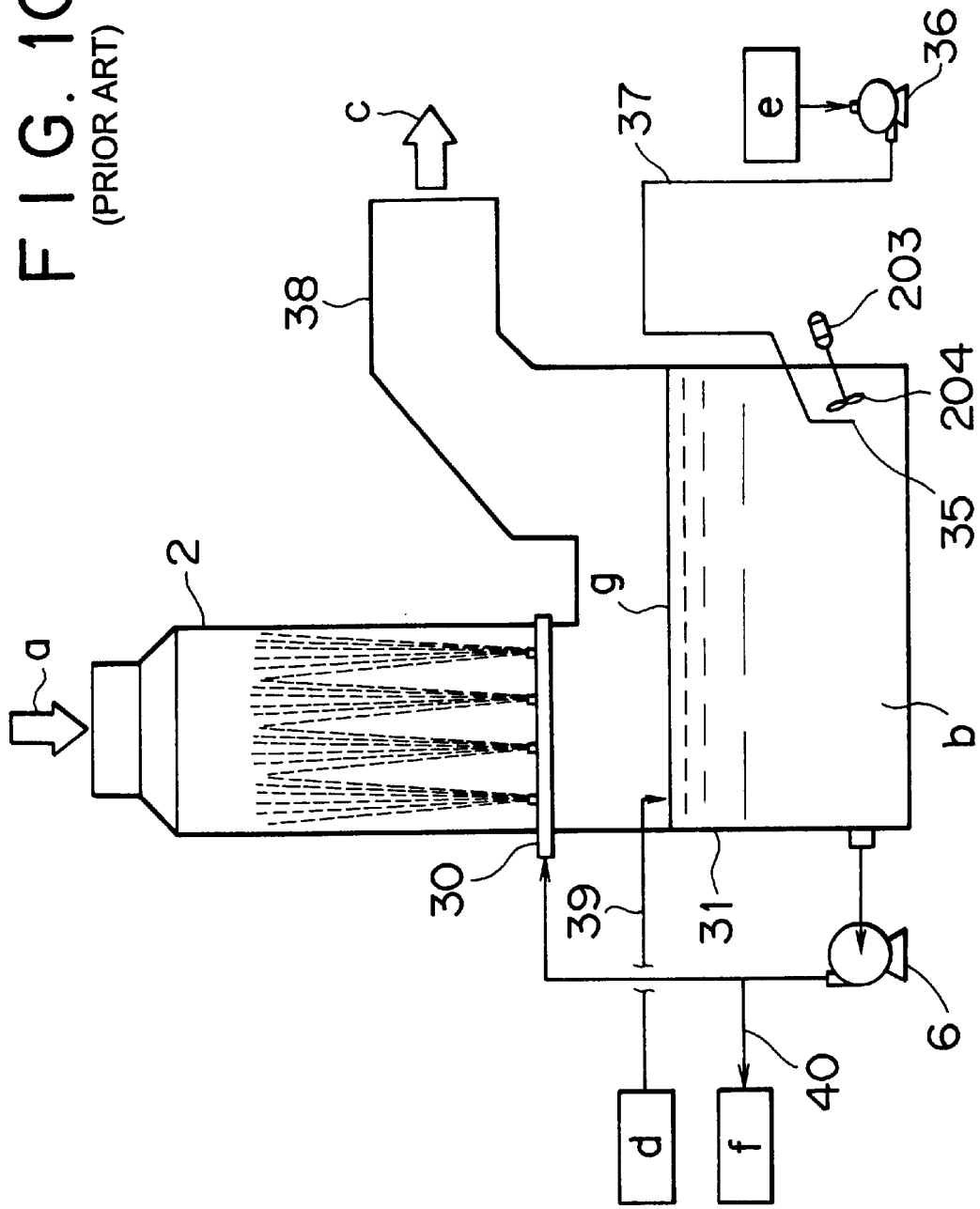
FIG. 10 is a schematic elevational view showing the overall construction of a gas-liquid contact apparatus in accordance with a second example of the prior art.
Figure 11:
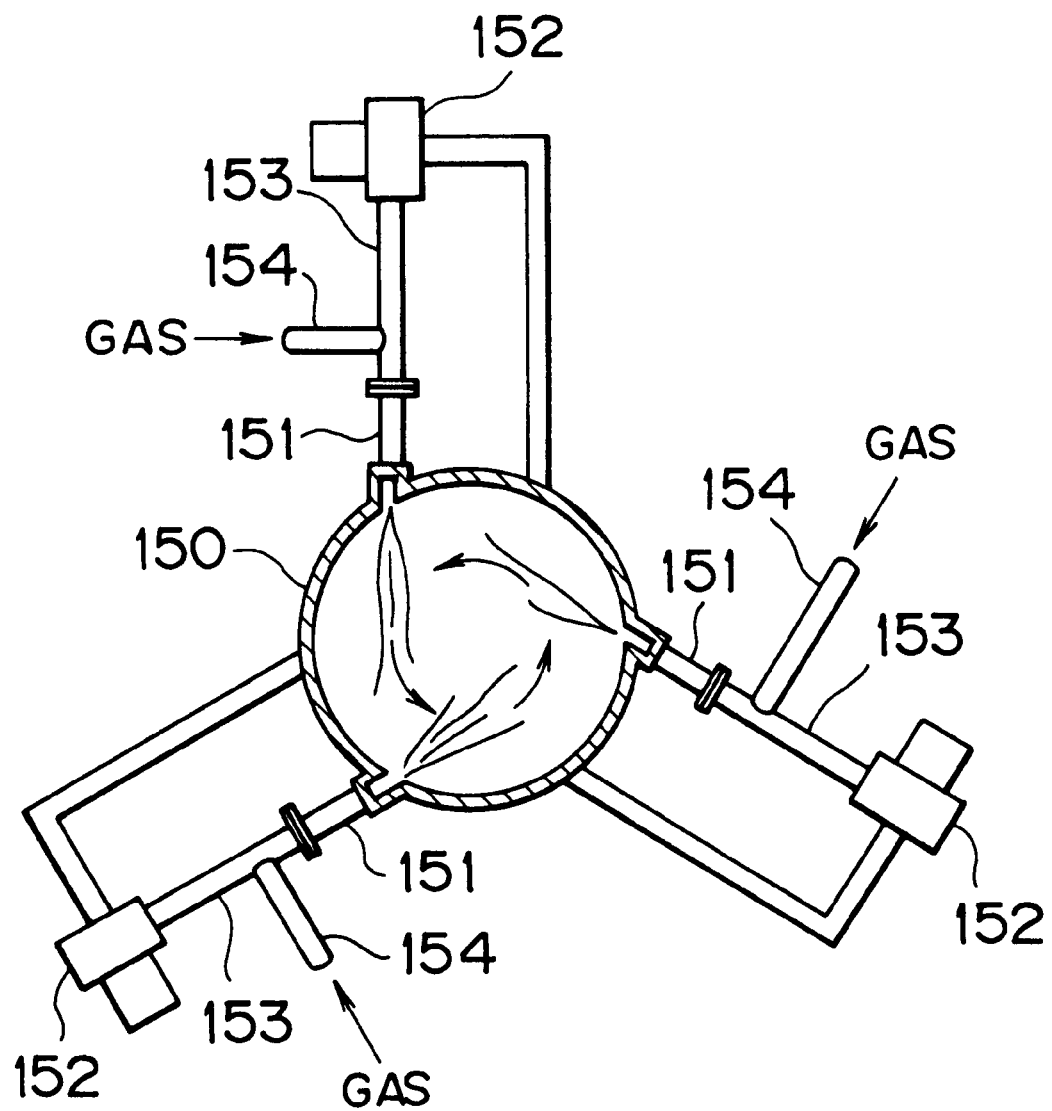
FIG. 11 is a top view showing the arrangement of an oxygen-containing gas blowing means within a fluid reservoir in accordance with a third example of the prior art.
Figure 12:
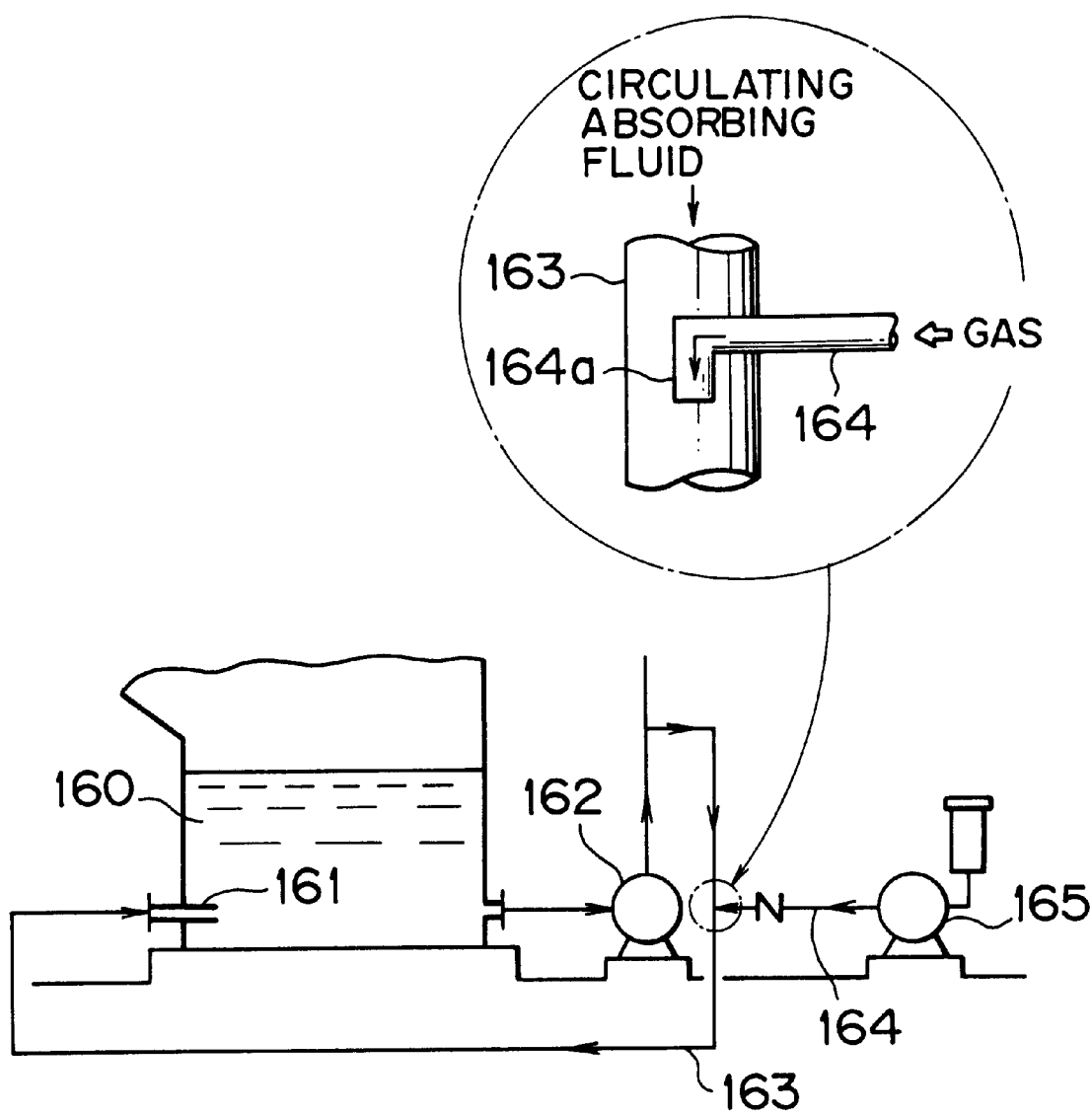
FIG. 12 is a schematic elevational view showing the construction of an essential part including the oxygen-containing gas blowing means of a gas-liquid contact apparatus in accordance with a fourth example of the prior art.

This embodiment is specifically described below with reference to FIGS. 3A and 4. In FIG. 3, components similar to those shown in FIG. 9 are designated by the same reference characters as given in FIG. 9.

In FIG. 3A, a wet flue gas desulfurizer is constructed so that this apparatus has an absorption tower 2 for effecting wet desulfurization, a fluid reservoir (slurry oxidation tank) 31 for storing an absorbing fluid b containing an alkaline absorbent d (e.g., lime) is disposed below absorption tower 2, and the absorbing fluid b within fluid reservoir 31 is raised by means of a circulating pump 6 and sprayed from spray pipes 30 disposed in the lower part of absorption tower 2.

In the above-described equipment construction, combustion exhaust gas a is introduced into absorption tower 2 at the top thereof, and brought into gas-liquid contact with the alkali-containing absorbing fluid b sprayed from spray pipes 30 so as to absorb and remove from the exhaust gas. Thereafter, the cleaned exhaust gas c is discharged to the outside through an exhaust duct 38.

On the other hand, the absorbing fluid b in which sulfites have been formed from $SO_2$ absorbed from the exhaust gas is returned to fluid reservoir 31, where the aforesaid sulfites are oxidized to sulfates with the aid of air e fed by an oxygen-containing gas blowing means which will be described later. Thereafter, waste fluid f is discharged by way of circulating pump 6 and a pipeline 40. Moreover, the absorbent d (e.g., lime) is supplied to fluid reservoir 31 through a pipeline 39.

This construction is the same as that of the conventional wet flue gas desulfurizer illustrated in FIG. 9.

The oxygen-containing blowing means of this embodiment comprises a pipeline 32 which is open in the absorbing fluid b storing part of fluid reservoir 31 at a position near the bottom end of its sidewall, a pump 33 connected to pipeline 32, and a delivery pipe 34 connected to pump 33 for returning the absorbing fluid b sucked out from fluid reservoir 31 by pump 33 back to fluid reservoir 31.

Figure 3B:
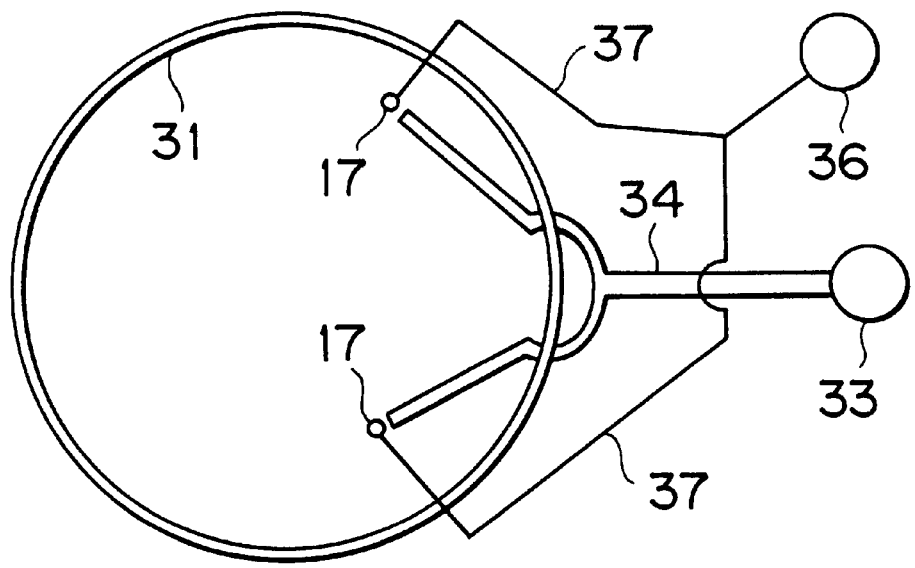
FIG. 3(B) is a top view showing the arrangement of a delivery pipe within a fluid reservoir.

The aforesaid delivery pipe 34 is disposed in such a way that it passes through the sidewall of fluid reservoir 34 and extends therein in a downwardly inclined direction. Moreover, as shown in FIG. 3(B), delivery pipe 34 is divided into two branches before passing through the sidewall of fluid reservoir 31, and each branch is radially deflected toward a tangential direction so that the stream discharged therefrom will flow along the sidewall of fluid reservoir 31. Furthermore, an oxygen feed nozzle 17 for injecting air e fed through a pipeline 37 by means of a blower 36 is disposed in front of the absorbing fluid discharge end 10 of each branch of delivery pipe 34 which is open in fluid reservoir 31.

Now, the positional relationship between delivery pipe 34 and oxygen feed nozzle 17 is explained with reference to FIGS. 4 to 6.

Figure 4:
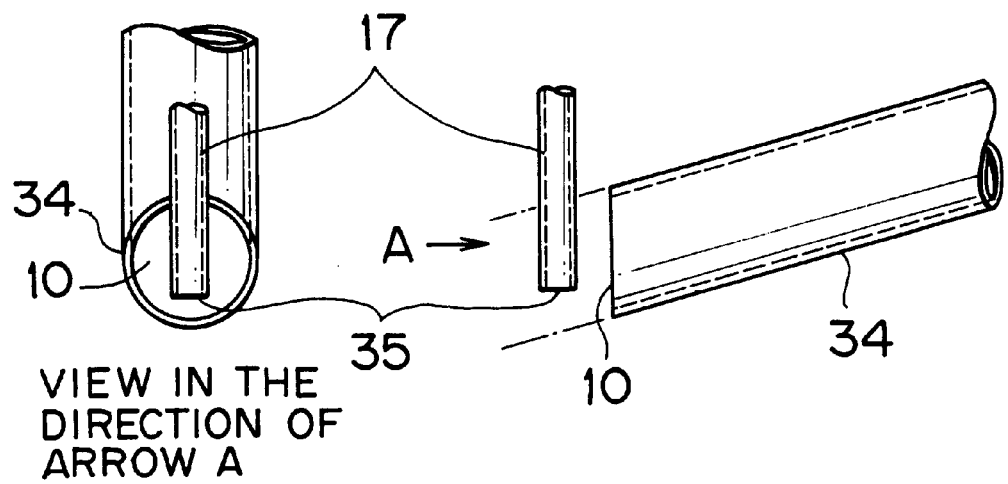
FIG. 4 is an enlarged fragmentary view of the absorbing fluid discharging part of an oxygen-containing gas blowing means which is used in the apparatus of FIG. 3 in accordance with a further embodiment (Embodiment 4) of the present invention.

The oxygen-containing gas blowing means of this embodiment is illustrated in FIG. 4.

In FIG. 4, oxygen feed nozzle 17 is vertically and downwardly disposed in front of the absorbing fluid discharge end 10 of the aforesaid delivery pipe 34. Moreover, an injection orifice 35 at the tip of oxygen feed nozzle 17 is positioned between an extension of the lower surface of discharge end 10 of delivery pipe 34 and the centerline thereof so that injection orifice 35 is disposed in the area of the jet just discharged from the aforesaid discharge end 10.

An experiment was conducted by using the oxygen-containing gas blowing means of FIG. 4 in a wet flue gas desulfurizer constructed as illustrated in FIG. 3. Specifically, combustion exhaust gas a containing about 1,000 ppm of $SO_2$ was introduced into the absorption tower 2 of FIG. 3 at a flow rate of 10,000 m³N per hour. On the other hand, the absorbing fluid b was sucked up from fluid reservoir 31 at a rate of 200 m³ per hour by means of circulating pump 6 and sprayed from spray pipes 30 into absorption tower 2. Thus, the aforesaid exhaust gas a was cleaned by wet desulfurization and discharged through exhaust duct 38 as the cleaned exhaust gas c.

While the absorbent d comprising limestone was supplied to fluid reservoir 31 through pipeline 39 in an amount which was stoichiometrically similar to that of $SO_2$ removed, gypsum was withdrawn through pipeline 40 as waste fluid f in an amount which was stoichiometrically equivalent to that of $SO_2$ removed. In fluid reservoir 31, the absorbing fluid b was stored so that the height of the liquid surface g was about 2 m. One end of pipeline 32 was connected to the sidewall of fluid reservoir 31 at a position 1.5 m below the liquid surface g, and the other end thereof was connected to pump 33. Delivery pipe 34 from pump 33 was disposed in such a way that it passed through the sidewall of fluid reservoir 31 at a position 1.3 m below the liquid surface g, penetrated into fluid reservoir 31 over a length of about 1 m, and had an absorbing fluid discharge end 10 which was open therein.

As shown in FIG. 3(B), delivery pipe 34 was divided into two branches before passing through the sidewall of fluid reservoir 31, and each branch was radially deflected toward a tangential direction so that the stream discharged therefrom would flow along the sidewall of fluid reservoir 31.

Using pump 33, the absorbing fluid b was sucked out at a flow rate of 100 m³ per hour, and injected into the absorbing fluid b from the respective absorbing fluid discharge ends of the two branches of delivery pipe 34. Correspondingly to delivery pipe 34, pipeline 37 was also divided into two branches. From oxygen feed nozzles 17 at the respective tips of the two branches of pipeline 37, air e was injected into the absorbing fluid b at a flow rate of 100 m³N per hour by means of blower 36.

The specifications of the equipment used in this experiment were as follows.

1) Absorption tower 2 had a cross-sectional area of 1 m² and its height above spray pipes 30 was 12 m.

2) The cross-sectional size of fluid reservoir 31 was 2 m×3.2 m and its height from the bottom was 3.5 m.

3) The nominal diameter of spray pipes 30 was 100 A, and each of them was provided with four upward nozzles having a nominal diameter of 40 A and a length of 100 mm.

4) The nominal diameter of pipeline 32 was 125 A.

5) The nominal diameter of delivery pipe 34 was 100 A, and the two branches thereof had a nominal diameter of 65

A. Each branch penetrated into fluid reservoir 31 through its 3.2 m wide sidewall [see 2) above] at a position 0.7 m above the bottom, extended over a length of 1 m in a direction inclined downward at an angle of about 20°, and had an open absorbing fluid discharge end 10. The distance between the two branches of delivery pipe 34 was 1 m.

6) The nominal diameter of pipeline 37 for the feed of an oxygen-containing gas was 25 A, and the two branches thereof had a nominal diameter of 20 A. This pipeline 37 was once raised to a height of 3 m above the liquid surface g of fluid reservoir 31, and then inserted into fluid reservoir 31.

7) The nominal diameter of the two oxygen feed nozzles was 20 A.

8) Injection orifice 35 at the tip of each oxygen feed nozzle 17 was located 2 cm above an extension of the lower surface of absorbing fluid discharge end 10.

In the experiment conducted under the above-described conditions, it was found that and the liquid surface g was raised by about 10 cm after starting the feed of air e and, moreover, the complete oxidation of sulfites was achieved.

Embodiment 5

Figure 5:
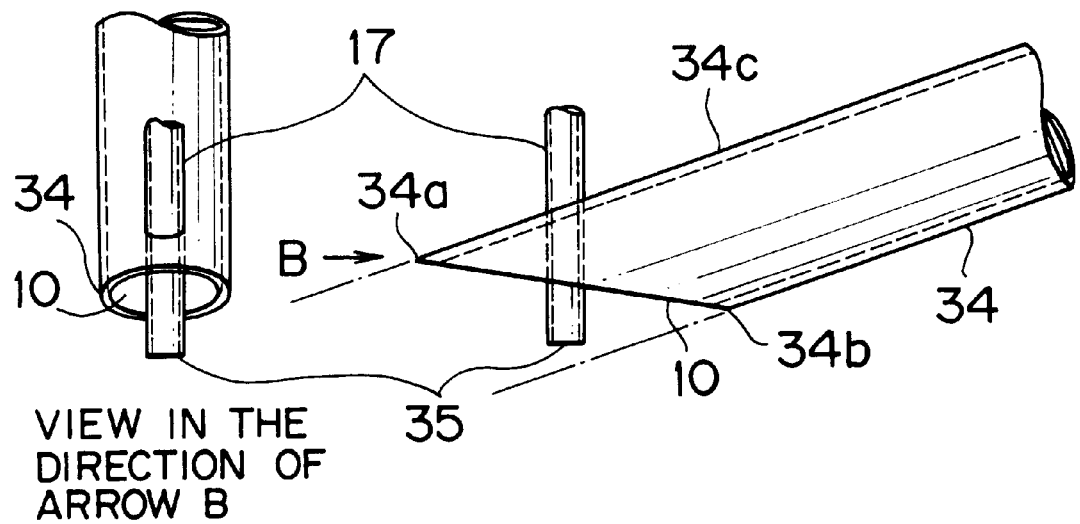
FIG. 5 is an enlarged fragmentary view of the absorbing fluid discharging part of an oxygen-containing gas blowing means which is used in the apparatus of FIG. 3 in accordance with a further embodiment (Embodiment 5) of the present invention.

The equipment used in this embodiment has substantially the same overall construction as that illustrated in FIG. 3, except that it is equipped with an oxygen-containing gas blowing means as illustrated in FIG. 5. In the embodiment of FIG. 5, the components designated by the same reference characters as given in FIGS. 3 and 4 function in the same manner as those shown in FIGS. 3 and 4.

In this embodiment, the tip of an absorbing fluid delivery pipe 34 extending in a downward direction is cut so as to have a substantially horizontal cut end as shown in FIG. 5. In other words, the upper part 34a of the discharge end 10 of delivery pipe 34 is made longer so as to overhang the lower part 34b thereof, and an oxygen feed nozzle 17 is attached so as to extend vertically through the overhanging part 34c from above.

An injection orifice 35 at the tip of oxygen feed nozzle 17 is located so that it lies within the limits of an extension of the horizontally cut delivery pipe 34.

Thus, the aforesaid injection orifice 35 of oxygen feed nozzle 17 is located in the area of the jet just discharged from the aforesaid discharge end 10.

Using the oxygen-containing gas blowing means of this embodiment, an experiment was conducted under the same experimental conditions as described above in connection with Embodiment 4. As a result, it was found that the complete oxidation of sulfites was achieved and the liquid surface g was raised by about 12 cm after starting the feed of air e.

Embodiment 6

Figure 6:
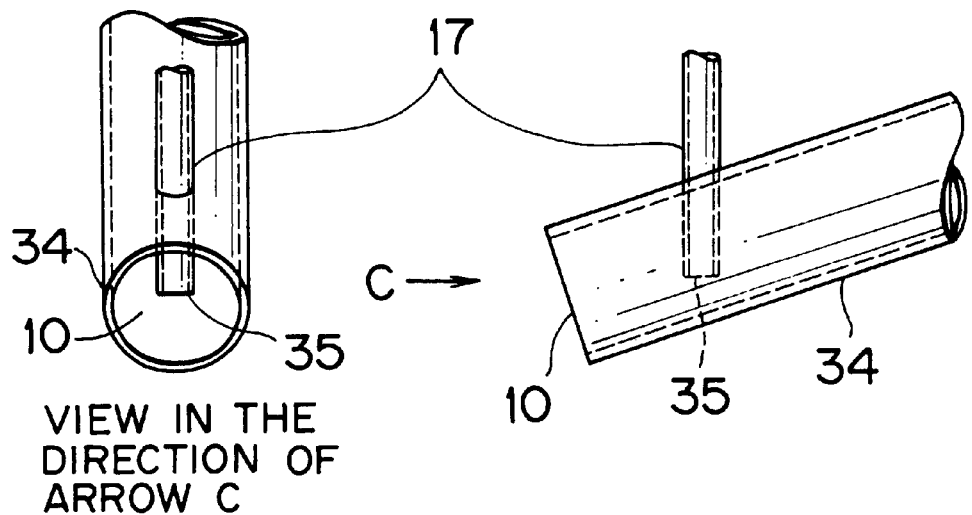
FIG. 6 is an enlarged fragmentary view of the absorbing fluid discharging part of an oxygen-containing gas blowing means which is used in the apparatus of FIG. 3 in accordance with a further embodiment (Embodiment 6) of the present invention.
Figure 7:
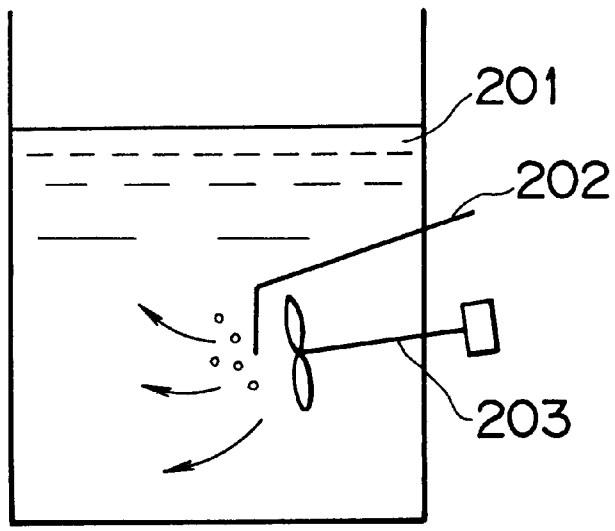
FIG. 7 is a schematic view for explaining an exemplary method for the agitation of supplied oxygen which has conventionally been employed in a wet flue gas desulfurizer.
Figure 8:
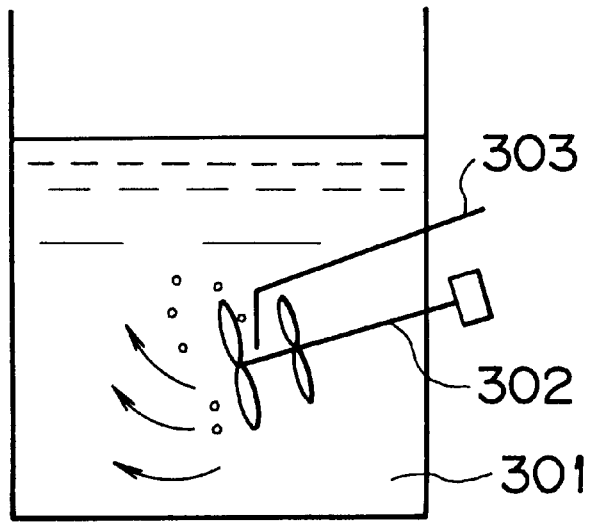
FIG. 8 is a schematic view for explaining another exemplary method for the agitation of supplied oxygen which has conventionally been employed in a wet flue gas desulfurizer.

The equipment used in this embodiment has substantially the same overall construction as that illustrated in FIG. 3, except that it is equipped with an oxygen-containing gas blowing means as illustrated in FIG. 6. In the embodiment of FIG. 6, the components designated by the same reference characters as given in FIGS. 3 and 4 function in the same manner as those shown in FIGS. 3 and 4.

In this embodiment, the tip of an absorbing fluid delivery pipe 34 extending in a downward direction is cut in a direction orthogonal to its central axis as shown in FIG. 6. Then, an oxygen feed nozzle 17 is attached so as to extend vertically through the top wall of delivery pipe 34 from above at a position just before the discharge end 10 thereof and thereby penetrate into delivery pipe 34, so that an oxygen-containing gas e is injected from an injection orifice 35 at a position just before the discharge end 10 of delivery pipe 34.

Using the oxygen-containing gas blowing means of this embodiment, an experiment was conducted under the same experimental conditions as described above in connection with Embodiment 4. As a result, it was found that the complete oxidation of sulfites was achieved and the liquid surface g was raised by about 15 cm after starting the feed of air e.

Thus, according to the above-described Embodiments 4–6, the oxygen feed nozzle is disposed at a position just behind or before the discharge end of the absorbing fluid delivery pipe. Consequently, vortices are generated on the downstream side of the oxygen feed nozzle in proportion to the flow rate of the jet of the absorbing fluid discharged from the discharge end. The oxygen-containing gas injected from the oxygen feed nozzle is divided into fine gas bubbles by the shearing action of the vortices, which leads to an increase in gas-liquid contact area and hence an improvement in oxidation performance.

Moreover, when the oxygen feed nozzle penetrates into the delivery pipe at a position just before the discharge end thereof as shown in FIG. 6, the cross-sectional area of the delivery pipe is reduced by the cross-sectional area of the penetrating oxygen feed nozzle, so that the flow velocity of the absorbing fluid flowing through the delivery pipe is increased. On the other hand, vortices are generated around the oxygen feed nozzle in proportion to the flow velocity of the absorbing fluid. When an oxygen-containing gas is blown in from the oxygen feed nozzle, this oxygen-containing gas is divided into fine gas bubbles by the action of the vortices, and the resulting gas-liquid mixed flow is discharged from the discharge end of the absorbing fluid delivery pie and dispersed in fluid reservoir 31.

As is evident from the above description, the wet flue gas desulfurizer of the present invention does not require unduly great power because the absorbent slurry is returned and utilized to agitate the slurry within the slurry oxidation tank. That is, since the slurry is withdrawn from the oxidation tank itself and returned thereto, the pump head necessary for producing this flow of the slurry can be decreased and, therefore, the required power can be reduced.

The equipment required to return the slurry has a simple structure, so that the equipment cost for the oxidizing air feeding device can be significantly reduced as compared with the prior art in which an unduly high cost has been required. Moreover, its maintenance is easy.

Furthermore, the oxygen-containing gas is finely divided by a current of the absorbing fluid itself, without resorting to agitation. Thus, the degree of utilization of oxygen can be enhanced as compared with the prior art.

When the slurry is made to flow by means of an agitator as has been the case with the prior art, there are restrictions on the position at which the agitator is installed. However, the apparatus of the present invention is free of such restrictions, so that the arrangement most suitable for the dispersion and mixing of gas bubbles may be employed.

The present invention also provides an oxygen-containing gas blowing device wherein an oxygen feed nozzle for injecting an oxygen-containing gas is disposed in the area of the discharged stream in the neighborhood of the discharge end of the absorbing fluid delivery pipe and, moreover, its injection orifice is located in the area of the jet just discharged from the aforesaid discharge end. Thus, the oxygen-containing gas injected from the oxygen feed nozzle can be divided into fine gas bubbles by the shearing action of the absorbing fluid discharged from the discharge end, and used for the purpose of completely oxidizing sulfites formed in the absorbing fluid from $SO_2$ absorbed as a result of the cleaning of exhaust gas. Moreover, since the oxygen-containing gas is finely divided and dispersed in the fluid reservoir by utilizing the jet of the absorbing fluid, the number of oxygen feed nozzles which may hinder inspection and cleaning operations in the fluid reservoir can be markedly reduced.

Moreover, the site of injection of the oxygen-containing gas may be determined at any desired position within the fluid reservoir so that no gas bubbles will be sucked into the pump. Consequently, the pump requires no extra power. In spite of that, a sufficient amount of the oxygen-containing gas can be supplied to the desired place. In addition, a satisfactory agitating effect on the absorbing fluid can be produced because the discharged jet of the absorbing fluid is accompanied by a wake to cause an increase in the flow rate thereof.

Moreover, the device of the present invention may be constructed in such a way that the upper part of the tip of the delivery pipe extends longer so as to overhang the lower part thereof, and the oxygen feed nozzle is attached by passing through the overhanging part. Thus, the oxygen-containing gas injected from the oxygen feed nozzle can be prevented from blowing through.

Furthermore, the aforesaid delivery pipe may be inclined downward in the fluid reservoir. This makes it possible to minimize the deposition of solid matter in the delivery tube during shutdown and to facilitate the discharge of solid matter at the time of restarting. In addition, the aforesaid delivery pipe may further be disposed so that the stream discharged from the delivery pipe will produce a circular flow in the aforesaid fluid reservoir. Thus, the gas-liquid contact time between the oxygen-containing gas and the absorbing fluid can be prolonged.

Furthermore, the device of the present invention may be constructed in such a way that the aforesaid oxygen feed nozzle penetrates into the delivery pipe at a position before the discharge end of the delivery pipe. Thus, the oxygen-containing gas can be dispersed in the form of finer gas bubbles.

What is claimed is:

1. A wet flue gas desulfurizer wherein sulfur dioxide is absorbed into a slurry and an oxygen-containing gas is blown into the slurry to oxidize sulfites present in the slurry, said desulfurizer comprising a slurry oxidation tank equipped with a return pipeline loxated outside of the slurry oxidation tank for returning a portion of the slurry to a position in said slurry oxidation tank, and the oxygen-containing gas is blown in at a discharge end of said return pipeline so as to divide the oxygen-containing gas by the action of the slurry returned through said return pipeline and to simultaneously agitate the slurry.

2. A wet flue gas desulfurizer as claimed in claim 1 further comprising header pipes positioned above said slurry oxidation tank and wherein the slurry is injected from said header pipes and returned through said return pipeline.

3. A wet flue gas desulfurizer as claimed in claim 1 further comprising a mist eliminator positioned above said slurry oxidation tank and wherein the slurry collected by said mist eliminator is returned through said return pipeline.

4. A wet flue gas desulfurizer as claimed in claim 3 further comprising a circulating pump in fluid communication with said slurry oxidation tank and a return pump in fluid communication with said slurry oxidation tank wherein a portion of the slurry is withdrawn at a position at the bottom of said slurry oxidation tank and sent to said header pipes under pressure by means of said circulation pump, and wherein said return pump is branched from the return pipeline for sending the slurry to said header pipes, and the oxygen-containing gas is blown in at the discharge end of said return pipeline so as to divide the oxygen-containing gas by the action of the slurry discharged from said return pipeline.

* * * * *